United States Patent [19]

Erich, Jr.

[11] 4,234,053
[45] Nov. 18, 1980

[54] SEISMIC EXPLORATION METHOD USING A ROTATING ECCENTRIC WEIGHT SEISMIC SOURCE

[75] Inventor: Otis G. Erich, Jr., La Habra, Calif.

[73] Assignee: Union Oil Company of California, Brea, Calif.

[21] Appl. No.: 956,613

[22] Filed: Nov. 1, 1978

Related U.S. Application Data

[63] Continuation-in-part of Ser. No. 765,799, Jan. 4, 1977, Pat. No. 4,143,737.

[51] Int. Cl.³ .............................................. G01V 1/14
[52] U.S. Cl. .................................. 181/121; 367/41; 367/55; 367/189
[58] Field of Search ..................... 367/23, 39, 41, 55, 367/189; 181/113, 114, 121, 1

[56] References Cited

U.S. PATENT DOCUMENTS

| 2,745,507 | 5/1956 | Bodine | 367/189 |
|---|---|---|---|
| 2,933,300 | 4/1960 | McCollum | 367/41 |
| 3,229,784 | 1/1966 | Lyons et al. | 181/121 |
| 3,264,606 | 8/1966 | Crook et al. | 367/39 |
| 3,416,632 | 12/1968 | Bodine | 367/55 |
| 3,583,521 | 6/1971 | Anstey | 181/121 |
| 3,676,841 | 7/1972 | Anstey | 367/41 |
| 3,697,938 | 10/1972 | Taner | 367/39 |
| 3,866,174 | 2/1975 | Barbier | 367/41 |
| 3,878,733 | 4/1975 | Tertinek | 74/61 |
| 3,909,147 | 9/1975 | Takata | 181/114 |
| 4,011,924 | 3/1977 | Barbier | 367/23 |
| 4,037,190 | 7/1977 | Martin | 367/41 |
| 4,058,791 | 11/1977 | Martin et al. | 367/39 |
| 4,064,964 | 12/1977 | Norden | 181/121 |
| 4,168,485 | 9/1979 | Payton et al. | 367/41 |

FOREIGN PATENT DOCUMENTS 358242  4/1938  Italy .......................................... 181/121

OTHER PUBLICATIONS

Cochran, "Seismic Signal Detection Using Sign Bits", 1973, p. 163, Geophysics, vol. 38.

Primary Examiner—Nelson Moskowitz
Attorney, Agent, or Firm—Dean Sandford; Daniel R. Farrell

[57] ABSTRACT

A seismic exploration method in which a rotating eccentric weight seismic source is employed to transmit a coded energy signal into the earth. A position sensor mounted on the source directly detects the instants at which the rotating eccentric passes a particular angular position about its axis of rotation, and generates a code signal which is used to correlate the raw seismic data. Preferably the source is allowed to decouple from the earth surface such that the coded energy signal transmitted into the earth is a coded impulse train.

15 Claims, 13 Drawing Figures

SECONDS

SEISMIC EXPLORATION METHOD USING A ROTATING ECCENTRIC WEIGHT SEISMIC SOURCE

RELATED APPLICATION

This is a continuation-in-part of application Ser. No. 765,799, filed Feb. 4, 1977 now U.S. Pat. No. 4,143,737.

BACKGROUND OF THE INVENTION

1. Field of the Invention

This invention relates to the art of geophysical exploration using artificial seismic energy, and more particularly, to a method for the seismic exploration of onshore regions which are relatively inaccesible to vehicles.

2. Description of the Prior Art

Geophysical prospecting using artificially induced seismic disturbances has found wide application in the search for petroleum and other valuable resources. It is the general practice to generate a source signal at a sourcepoint near the surface of the earth and to transmit this signal into the earth. The reflected and/or refracted energy returning from within the earth to a receiver location is sensed and raw seismic data is recorded. The raw seismic data is mathematically processed and then interpreted to provide an indication of the structure of the underlying strata. In the exploration of onshore regions which are relatively inaccessible to vehicles, the weight of supplies and equipment required determines the practicality of a particular exploration system.

At the present time, a wide variety of seismic exploration systems are available. In some of these systems, a coded energy signal is transmitted into the earth and the raw seismic data which is obtained is correlated with a signature of the coded energy signal. The signature of the coded energy signal must be of very good quality in order to obtain a good quality correlated trace. These coded energy signal systems can be generally classified, according to the method by which the signature used to correlate the raw trace is obtained, as either a master-type or a slave-type source system. In the master-type source systems, the signature is generally sensed as the coded energy signal is transmitted. In the slave-type source systems, the source signature used to correlate the raw trace is the predetermined signal which is used to drive the "slave" source during the generation of the coded energy signal.

In the master-type source system disclosed in U.S. Pat. No. 4,011,924, the sequence of the individual impulses which make up the coded energy signal is controlled manually within the physical limits of the powered impactor. Powered impactors are difficult to control in a manner which will produce a high quality coded energy signal because they tend to operate at certain natural frequencies and are also subject to undesirable residual bounces. A master-type source system employing a rotating eccentric weight source which is coupled to the earth is disclosed in U.S. Pat. No. 3,185,250 to Glazier. In the prior art master-type source systems the source signature is generally detected by an acoustic sensor which is responsive to the outgoing seismic signal, such as an accelerometer or geophone which is located on or near the source. While these master-type source systems of the prior art are relatively light-weight and would therefore be well suited to exploration in regions not accessible to vehicles, they have not been used successfully because the acoustic sensors which have been employed to detect the source signature are necessarily sensitive to any acoustic energy and therefore the signatures obtained are attenuated and phase-shifted and usually contain significant background interferences. Cross-correlation of the raw seismic data with this poor quality source signature yields a poorly resolved correlated trace. Numerous methods have been devised in an attempt to extract the true source code from the attenuated signal generated by the prior art sensors, however, these methods have only been moderately successful.

On the other hand, the correlated traces obtained by use of the "slave-type" source systems generally have much better resolution. Because the source used in these methods can be made to transmit coded energy signals according to a predetermined code, the code is known and need not be detected by use of an acoustic sensor. Furthermore, carefully preselected coded energy signals which tend to yield high resolution seismic data can be transmitted by precise control of the source. These systems, such as the well known VIBROSEIS ® system developed and licensed by Continental Oil Company, Ponca City, Oklahoma, have been relatively successful. However, the weight of the equipment required, specifically the heavy source control devices and vibrators employed, increases markedly as the resolving power of these systems is enhanced. Moreover, since the VIBROSEIS ® and smilar sources must be coupled to the ground, it has been determined that the peak force to weight ratio must be less than 1. These sources are normally vehicle mounted and weigh between about 10 and about 20 tons. Due to this great weight, these "slave-type" source systems are impractical for use in regions not accessible to vehicles.

Due to the various inadequacies and limitations of these prior art coded energy signal systems, exploration in regions not accessible to vehicles is currently performed with the more primitive single-shot explosive methods. These methods are currently preferred even though they require seismic and drilling crews of typically between 100 and 500 men to carry the equipment and supplies. In many regions, these explosive methods are prohibited due to their adverse impact on the environment. Clearly a need exists for a light weight, high resolution seismic exploration system for use in regions not accessible to vehicles.

Accordingly, a primary object of this invention is to provide a lightweight and high resolution seismic exploration system.

Another object of this invention is to provide a seismic exploration method in which the signature of the outgoing seismic signal can be obtained without the undesirable attenuation and phase-shifting which exemplify the comparable prior art systems.

Yet another object of this invention is to provide a seismic exploration method in which the required weight of the exploration equipment is reduced without sacrificing seismic data quality.

A further object of this invention is to provide a seismic exploration system for use in relatively inaccessible onshore applications in which the source and the data recording method employed cooperate to reduce the overall weight requirement of the system.

Still another object of this invention is to provide a multiple-impulse seismic exploration system which includes means for directly detecting the time breaks of the source impulses.

Other objects and advantages of this invention will become apparent to those skilled in the art from the following description.

SUMMARY OF THE INVENTION

Briefly, the invention provides a seismic exploration method in which a novel rotating eccentric weight seismic source is employed to transmit a coded energy signal into the earth. A position sensor mounted in the source directly detects the instants at which the rotating eccentric passes that particular angular position about its axis of rotation which corresponds to the peak earthward force generated by the source during each revolution of the rotating eccentric, and generates a code signal having a plurality of discrete pulses, each of which corresponds to one of said instants. The code signal is used in the correlation of the raw seismic data sensed at a receiver location.

When the source is coupled to the earth, the coded energy signal will be a variable-frequency, sinusoidal signal. Preferably the source is not coupled to the earth and the rotatable eccentric is rotated at varying speeds sufficient to cause the source to alternately decouple from and impact against the earth surface, thereby transmitting a coded train of impulses into the earth.

In a preferred embodiment of the method of this invention, a pair of coaxial rotatable eccentrics are counter-rotated about their common axis to generate the coded energy signal. In another preferred embodiment, first and second pairs of coaxial rotatable eccentrics are counter-rotated about parallel, spaced apart axes and the phase relationships of the rotating eccentrics in each pair is adjusted during the generation of the coded energy signal in order to control the magnitude of the peak earthward force developed by the source.

Yet another preferred embodiment of the method of this invention involves the consecutive transmission of a plurality of differently coded energy signals from the same sourcepoint to form a corresponding plurality of correlated traces for each geophone location. These correlated traces are then vertically stacked to advantageously attenuate undesirable correlation residuals and thereby improve signal resolution.

BRIEF DESCRIPTION OF THE DRAWINGS

The invention will be more readily understood by reference to the accompanying drawings, in which.

DETAILED DESCRIPTION OF THE INVENTION

Figure 1:
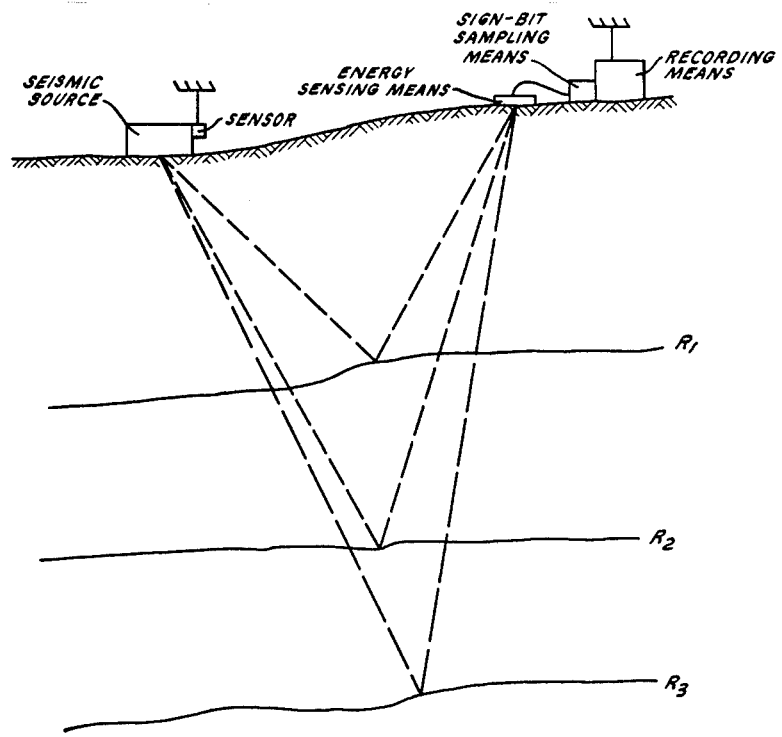
FIG. 1 is a schematic diagram of a cross-section of earth strata illustrating one embodiment of the exploration method of this invention.

The novel seismic sources of this invention are provided with one or more eccentric weights which are caused to rotate about an axis of rotation. The weights may rotate in unison or may be counter-rotating, although counter-rotation is preferred. A prime mover causes the weights to rotate about the axis of rotation at either increasing or, alternatively, decreasing speeds, thereby generating an energy signal with a frequency varying code. If the source is coupled to the earth, the coded energy signal transmitted into the earth will be a sinusoidal function. Preferably, in the method of this invention, the source is not coupled to the earth and a multiple impulse coded energy signal is developed by a plurality of impacts of the source against the earth surface.

As used herein, the term "coupled to the earth" means that the source is held in continuous contact with the earth surface, usually by hold down weight or anchors. In contrast, decoupling sources bounce, that is, their contact with the earth surface is discontinuous during the period of the seismic energy transmission.

In either mode of operation, a position sensor mounted on the source directly detects the exact instants at which the center of mass of the rotating weight passes a particular angular position about the axis of rotation, which position corresponds to the point at which the peak earthward force is developed by the source.

The decoupling sources of this invention strike the earth surface once during each revolution of the eccentric weight(s), the instant of impact coinciding with the instant at which the peak earthward force is developed. The position sensor generates a code signal which contains the time break of each occurrence of the peak earthward force and therefore the time break of the source impulses.

The position sensors useful in this invention include magnetic, optical and electrical devices which are well known in the sensing art. The position sensor is comprised of (1) an actuator and (2) a pulse generator which generates a pulse at each instant that the actuator passes in close proximity to it. The actuator and pulse generator are mounted so that they are in close proximity at, and preferably only at, the instant of peak earthward force of the source for each revolution of the rotatable weights. One of these elements normally the actuator, is mounted so that it rotates with the rotating eccentric weight and the other, normally the pulse generator, is stationary. The rotating element can be mounted on one of the rotating weights or, for example, on a wheel, gear, or arm which is rotatable with the eccentric weight.

Position sensors suitable for use in this invention are those which emit a pulse or small wavelet in response to a desired stimulus, but which are relatively insensitive to background interferences including vibrations, sounds, radio signals and ground noises. Suitable position sensors include: optic sensors, comprising a light source actuator and a photocell pulse generator; electrical sensors, comprising for example a metal contact actuator which completes the otherwise open circuit of the electrical pulse generator, thereby allowing a current to flow; and magnetic sensors, comprising a metal protrusion, or preferably, a magnet actuator and a pulse generator comprising an electric wire coiled around either a magnet or a metal pole piece in a magnetic field, in which coil an electric current is induced by the movement of the actuator past the pulse generator. Optic and magnetic sensors are preferred because they are more durable and require less maintenance. A wide variety of suitable magnetic sensors are available from the Electro Corporation of Sarasota, Florida, and others.

The forces developed by rotation of eccentric weights about an axis of rotation act, in general, perpendicular to the axis of rotation. Although the axis of rotation of the sources of this invention can be arranged in any plane, it is preferred that the source be positioned on the earth surface so that the axis of rotation is perpendicular to the desired plane of force. Accordingly, for vertical exploration of earth strata underlying a horizontal surface, it is preferred that the axis of rotation is substantially horizontal, i.e., parallel to the surface of the earth.

The instant of peak earthward force of the source is the instant at which the earthward component of the vector sum of the rotating eccentric weight(s) momentum vector(s) is at a maximum away from the earth. The peak earthward force occurs once per revolution of the eccentric weight(s) and its magnitude can vary depending on the rotational speed and eccentric moment(s) of the rotating weight(s). For a given orientation of the rotating eccentric weight source, the position of the eccentric weight(s) at the instant of peak earthward force for each revolution will always be the same. Accordingly, the actuator and the pulse generator should be positioned so that the rotating element passes the stationary element as the center of mass of the eccentric weight(s) passes the point corresponding to the angular position at which the peak earthward force is developed. For a single eccentric weight rotating about an axis parallel to the horizontal earth surface, the peak earthward force is developed when the center of mass is rising and is at the same height as its axis of rotation, corresponding to its highest velocity away from the earth.

Figure 3:
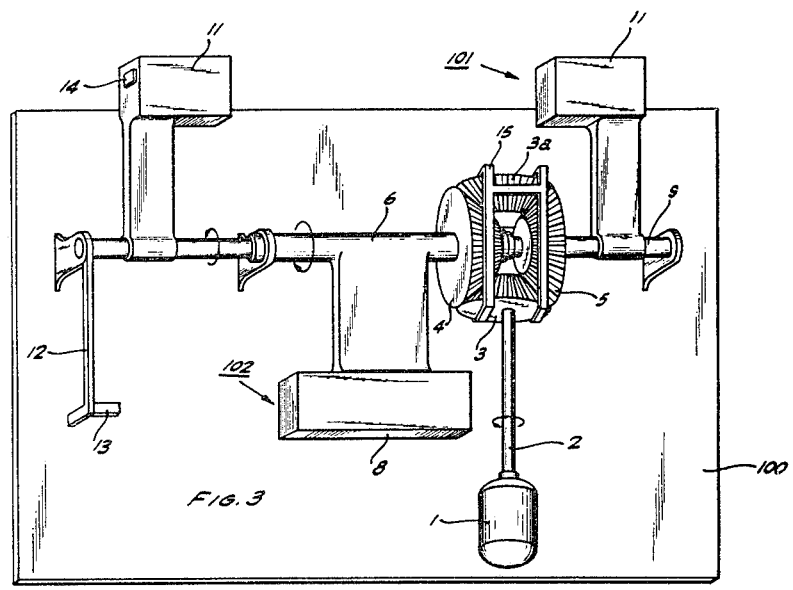
FIG. 3 is a top view of one embodiment of the counter-rotating eccentric weight seismic source of this invention.

For a set of balanced co-axial counter-rotating eccentric weights, such as illustrated in FIG. 3, the net force generated by the rotating weights acts in only one plane, since the components of their momentum vectors which are perpendicular to that plane cancel each other. The instant of peak force occurs twice during each revolution when the centers of mass of the weights are 180° apart. The direction of the peak force is opposite to the direction of travel of the rotatable elements in the 180° opposed position, thus the peak force occurs twice per revolution, but in opposite directions. The plane of the produced force passes through the axis of rotation and is perpendicular to a line connecting the centers of mass of the eccentric weights in that position. The position of the weights at the instant of peak earthward force depends on the angle of this force plane with respect to the earth.

As used herein, the term "master-type source system" means a seismic exploration system in which the seismic data obtained is correlated with a source signature obtained by sensing or monitoring the outgoing seismic signal or some other characteristic of the seismic source, as opposed to "slave-type source systems" in which the seismic data obtained is correlated with the predetermined source code by which the source was driven to generate the coded energy signal. The preferred sources for exploration of relatively inaccessible regions are manually controlled sources, although sources which generate energy in response to a master controller, such as a programmed minicomputer, can be used.

Figure 2:
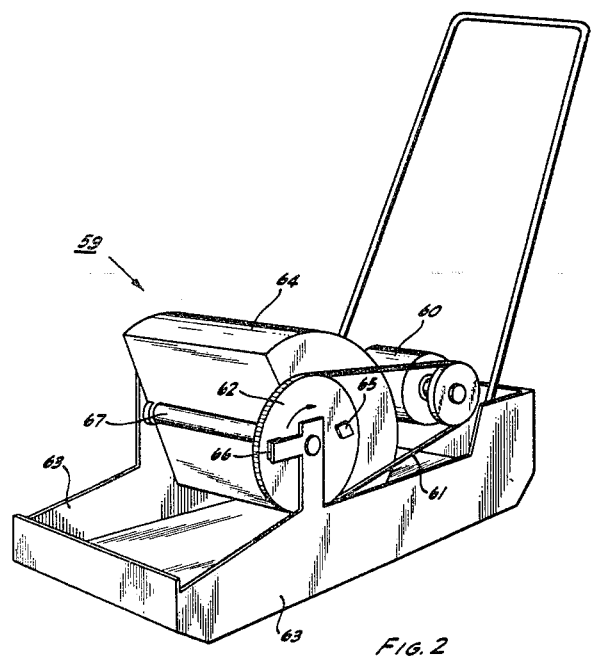
FIG. 2 is a perspective view of one embodiment of the rotating eccentric weight seismic source of this invention.

FIG. 2 illustrates one embodiment of the rotating eccentric weight seismic source of this invention employing a single rotatable element. In this embodiment, rotatable element 59 includes eccentric weight 64, having a center of mass displaced from the axis of rotation and pulley 62, both of which are fixedly attached to axle 67. Axle 67 is rotatably mounted on base 63 by means of bearings not shown, and is supported above and parallel to the lower surface of base 63. Rotatable element 59 is rotatable about an axis coincident with the center line of axle 67, i.e., the axis of rotation is parallel to and above the lower surface of base 63. Prime mover 60 is mounted on base 63 and drives rotatable element 59 by drive belt 61 which engages pulley 62.

Actuator 65 is attached to pulley 62 so as to rotate with rotatable element 59 and is located at a point about axle 67 coinciding with a radius that passes through the center of mass of rotatable element 59. Pulse generator 66 is fixedly mounted on base 63 and is located in a position such that actuator 65 passes it once during each revolution of rotatable element 59 at the point corresponding to the angular position of the center of mass of element 59 at which the peak earthward force is developed, i.e., in this embodiment at the point at which the center of mass is traveling perpendicular to and away from the lower surface of base 63.

In operation, prime mover 60 drives rotatable element 59 clockwise by means of drive belt 61. When eccentric weight 64 has been rotated clockwise from the illustrated position until the flat face of weight 64 is perpendicular to the lower surface of base 63 and facing prime mover 60, the center of mass of rotatable element 59 will be traveling perpendicular to and away from the lower surface of base 63 and actuator 65 will be aligned with and in close proximity to pulse generator 66. This is the position of the rotatable element at the instant of peak earthward force, and occurs once during each revolution of element 59. The force magnitude generated will increase as the rotational speed is increased and will decrease as the rotational speed is decreased.

The exact angular and radial positions of actuator 65 and pulse generator 66 about the axis of rotation are not critical as long as they become aligned and pass in close proximity at the instant of peak earthward force for each revolution of rotatable element 59.

Conventional vibrating plate compactors which are employed to compact soils and asphalt are similar in design to the apparatus illustrated in FIG. 2. These compactors, such as those marketed by the Wacker Corporation of Milwaukee, Wisconsin, can be modified by the addition of a sensor of the type hereinabove described to produce one embodiment of the rotating eccentric weight seismic source of this invention. However, for use in non-vehicular regions, a lighter weight seismic source of the basic design illustrated in FIG. 2 can be constructed by more careful selection of the construction materials as discussed more fully hereinafter.

FIG. 3 illustrates another embodiment of a rotating eccentric weight seismic source of this invention employing coaxial counter-rotating eccentric weights. In this embodiment, rotatable element 101 includes eccentric weights 11 having centers of mass displaced from the axis of rotation and gear 5, both of which are fixedly attached to axle 9; and rotatable element 102 includes eccentric weight 8 having a center of mass displaced from the axis of rotation and gear 4, both of which are fixedly attached to axle 6, which is concentric with axle 9. Axles 6 and 9 are rotatably mounted on base 100 by means of bearings, not shown, and are supported above and parallel to the lower surface of base 100. Rotatable elements 101 and 102 are counter-rotatable about an axis coincident with the center line of concentric axles 6 and 9, i.e., the axis of rotation is parallel to and above the lower surface of base 100. Prime mover 1 is mounted on base 100 and counter-rotates rotatable elements 101 and 102 by means of shaft 2 and conversion gears 3 and 3a. Conversion gears 3 and 3a are secured by frame 15 and are preferably enclosed by a gear housing, not shown.

Actuator 14 is attached to eccentric weight 11 so as to rotate with rotatable element 101 and is located at a point about axle 9 coinciding with a radius that passes through the center of mass of rotatable element 101. Pulse generator 13 is fixedly mounted on base 100 by brace 12 and is located in a position such that actuator 14 passes it once during each revolution of rotatable element 101 at the point corresponding to the angular position of actuator 14 at which the peak earthward force is developed. This angular position depends on the relative orientation of elements 101 and 102.

In the preferred embodiment, the eccentric moments of elements 101 and 102 about the axis of rotation are equal and elements 101 and 102 are oriented such that the rotating centers of mass are 180° apart about the axis of rotation when they are traveling perpendicular to and away from the lower surface of base 100. By employing rotatable elements with equal eccentric moments, the force generated by the source will act in only one plane, which plane passes through the axis of rotation and is perpendicular to a line connecting the rotatable element centers of mass when they are 180° apart. Preferably rotatable elements 101 and 102 are oriented such that the plane of force is perpendicular to the earth surface.

In operation, prime mover 1 rotates gear 3 via shaft 2, thereby rotating rotatable element 102 in a clockwise direction, and rotatable element 101 in a counter-clockwise direction, and rotatable element 101 in a counterclockwise direction. With base 100 placed on a horizontal earth surface, the instant of peak earthward force occurs when counter-rotating elements 101 and 102 are disposed 180° apart, and the center of mass of each element is traveling perpendicular to and away from the lower surface of base 100. When elements 101 and 102 are at this position, actuator 14 will be aligned with and in close proximity to pulse generator 13.

It is preferred that elements 101 and 102 rotate at the same speed. As the rotational speed is increased, the magnitude of the peak force generated will increase and as the rotational speed is decreased, the magnitude of the force will decrease.

Figure 4:
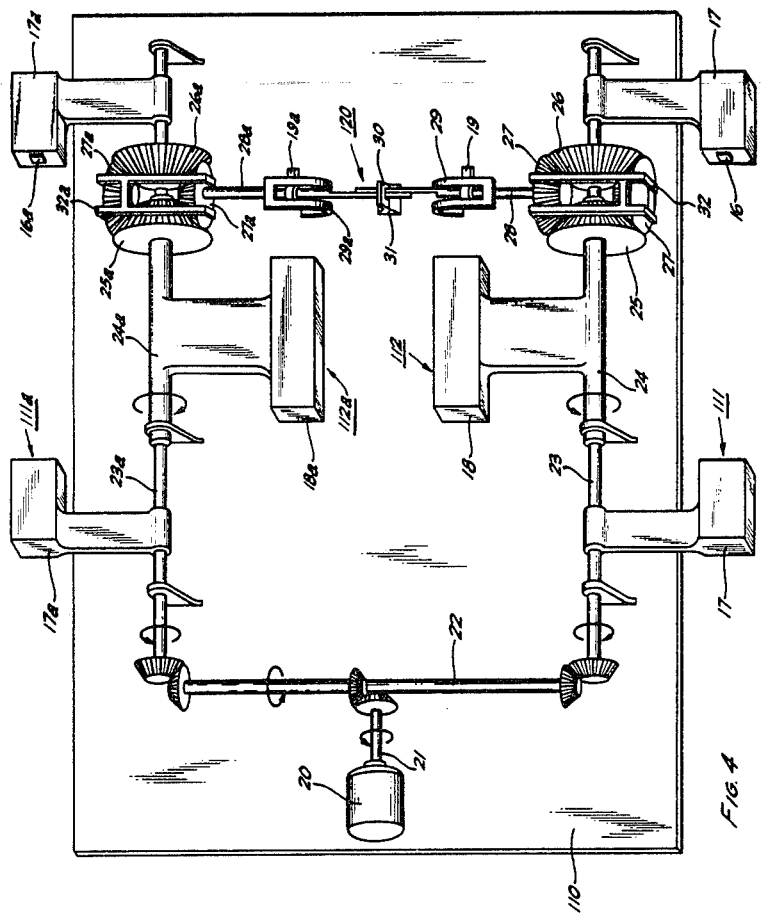
FIG. 4 is a top view of another embodiment of the counter-rotating eccentric weight seismic source of this invention.
Figure 5A:
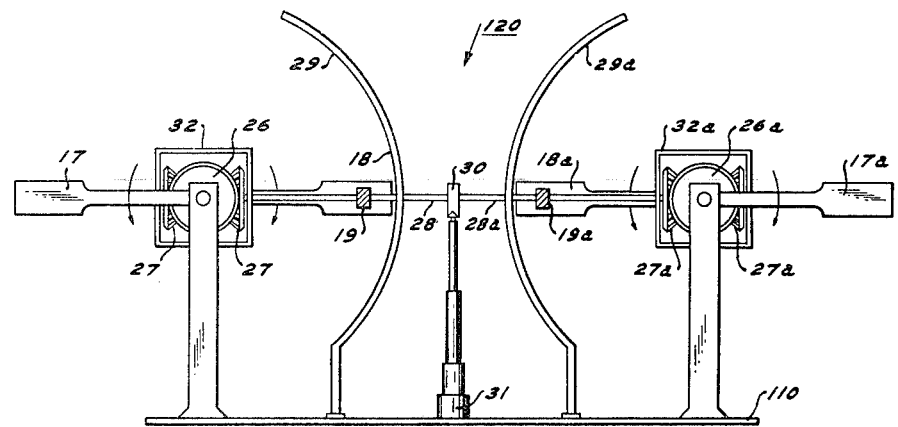
FIGS. 5A and 5B are end views of the seismic source illustrated in FIG. 4.
Figure 5B:
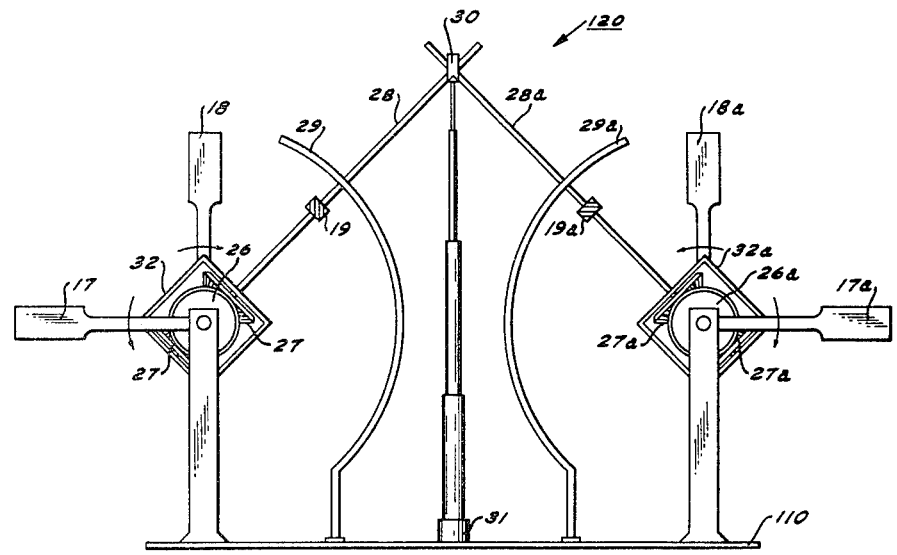

FIGS. 4, 5A and 5B illustrate still another embodiment of a rotating eccentric weight seismic source of this invention employing a mirror image pair of coaxial counter-rotating eccentric weight units. In this embodiment, there are four rotatable elements as follows: (1) rotatable element 111 includes eccentric weights 17, having centers of mass displaced from a first axis of rotation, and gear 26, both of which are fixedly attached to axle 23; (2) rotatable element 111a includes eccentric weights 17a, having centers of mass displaced from a second axis of rotation parallel to and displaced from the first axis of rotation, and gear 26a, both of which are fixedly attached to axle 23a which is parallel to and displaced from axle 23; (3) rotatable element 112 includes eccentric weight 18, having a center of mass displaced from said first axis of rotation, and gear 25, both of which are fixedly attached to axle 24 which is concentric with axle 23; and (4) rotatable element 112a includes eccentric weight 18a, having a center of mass displaced from said second axis of rotation, and gear 25a, both of which are fixedly attached to axle 24a which is concentric with axle 23a. Axles 23, 23a, 24 and 24a are rotatably mounted on base 110 by means of bearings, not shown, and are supported above and parallel to the lower surface of base 110. Rotatable elements 111 and 112 are counter-rotatable about said first axis of rotation which is coincident with the center line of concentric axles 23 and 24, and rotatable elements 111a and 112 are counter-rotatable about said second axis of rotation which is coincident with the center line of concentric axles 23a and 24a, i.e., the first and second axes of rotation are parallel to and equidistant above the lower surface of base 110 and are displaced from each other.

Prime mover 20 is mounted on base 110 and drives axles 23 and 23a in opposite directions via shafts 21 and 22 and the appropriate gear means shown and through conversion gears 27 and 27a which are secured by frames 32 and 32a, respectively, drives axles 24 and 24a in opposite directions. Consequently, rotatable elements 111 and 112 are counter-rotated about a first axis of rotation, rotatable elements 111a and 112a are counter-rotated about a second axis of rotation, with rotatable elements 111 and 111a being rotated about their respective axis in opposite directions, as are elements 112 and 112a.

In the preferred embodiment illustrated, the eccentric moments of the four rotatable elements about their respective axes of rotation are equal; the rotatable elements all rotate at the same speed; and the angular positions of the centers of mass of elements 111a and 112a are at all times a mirror image of the angular positions of the centers of mass of elements 111 and 112 respectively. As described above with reference to the force generated by balanced coaxial counter-rotating weight source of FIG. 3, the force generated by each of the balanced coaxial counter-rotating weight units of FIG. 4 acts only in one angular plane, which plane passes through the axis of rotation and is perpendicular to a line connecting the centers of mass of the counter-rotating eccentric weights when the weights are 180° apart. The angle of this plane about the axis of the rotation depends on the phase relationship or orientation of the counter-rotating weights.

Phase shifting means 120 is provided for adjusting the phase relationship of the counter-rotatable elements of each unit, thereby adjusting the angle of the plane of force generated by each unit and consequently altering the peak force magnitude. Phase shifting means 120 includes conversion gears 27 and 27a which are secured by frames 32 and 32a, respectively, and which are angularly adjustable about the first and second axes of rotation by rods 28 and 28a, respectively. Rods 28 and 28a are, respectively, perpendicular to the first and second axes of rotation, are restricted from lateral movement by guides 29 and 29a, and are slidably held at adjustable angular positions about their respective axes by rod holder 30. Jack 31 mounted on base 110 is provided to adjust the vertical position of rod holder 30 and consequently the angular positions of rods 28 and 28a and conversion gears 27 and 27a.

FIGS. 5A and 5B illustrate the operation of phase shifting means 120. Jack 31 adjusts the vertical position of rod holder 30 which results in a rotation of rod 28, frame 32 and conversion gears 27 counter-clockwise about the first axis of rotation and of rod 28a, frame 32a and conversion gears 27a clockwise about the second axis of rotation. A rotation of rods 28 and 28a through any angular displacement results in a shift in the position of weights 18 and 18a relative to weights 17 and 17a of twice the angular displacement. The rotation of weights 18 and 18a is always twice that of rods 28 and 28a due to (1) the angle of rotation of the rods and (2) the rotation of conversion gears 27 and 27a due to movement past stationary gears 26 and 26a.

FIG. 4 illustrates actuators 16 and 16a mounted on, respectively, weights 17 and 17a so as to rotate with, respectively, rotatable elements 111 and 111a. Actuators 16 and 16a are located at a point about their respective axes of rotation coinciding with radii that pass through the center of mass of, respectively, rotatable elements 111 and 111a. Pulse generators 19 and 19a are fixedly mounted on rods 28 and 28a, respectively, and are located in such positions that the respective actuator 16 or 16a passes it once during each revolution of respective rotatable element 111 or 111a at the point corresponding to the angular position of the respective actuator at which the peak earthward force for each revolution is developed. This angular position depends on the relative orientation of the rotatable elements about their respective axis of rotation. The angular positions of pulse generators 19 and 19a mounted on rods 28 and 28a respectively are automatically adjusted as the phase shifting means 120 changes the phase relationship and consequently the angular positions of the centers of mass of the rotatable elements which correspond to the angular positions at which the peak earthward force for each revolution is generated.

Referring to FIG. 5A, the centers of mass of the rotatable elements are all traveling perpendicular to and toward the lower surface of base 110; pulse generators 19 and 19a and actuators 16 and 16a (on the back side of weights 17 and 17a respectively) are 180° apart about their respective axis of rotation and in a plane therethrough. The angular positions of the rotatable elements at which the peak earthward force is developed is reached by rotating the eccentric weights 180° in the directions shown. In that position all the centers of mass will be traveling perpendicular to and away from the lower surface of base 110; and actuators 16 and 16a will be aligned with and in close proximity to pulse generators 19 and 19a respectively.

FIG. 5B illustrates the position attained when the rod holder 30 has been raised to correspond to a 45° angular adjustment of rods 28 and 28a about their respective axes of rotation. In this position, weights 18 and 18a are traveling parallel to the lower surface of base 110 and toward the center thereof; weights 17 and 17a are traveling perpendicular to and toward the lower surface of base 110; and actuators 16 and 16a (attached to weights 17 and 17a respectively) and pulse generators 19 and 19a (attached to weights 17 and 17a respectively) and pulse generators 19 and 19a (attached to rod holders 28 and 28a respectively) are 225° apart about their respective axes of rotation. From summation of the momentum vectors of the rotatable elements at all points in a revolution, it will be apparent that the angular positions of the rotatable elements of the apparatus of FIG. 5B, at which the peak earthward force is developed, are reached by a 225° rotation of those elements in the directions shown. In that position, the centers of mass of weight 18 and 17 will be 180° apart about the first axis of rotation and traveling away from the center of the lower surface of base 110 at an angle of 45° from that surface; the centers of mass of weights 18a and 17a will be 180° apart about the second axis of rotation and traveling away from the center of the lower surface of base 110 at an angle of 45° from that surface; and actuators 16 and 16a will be aligned with and in close proximity to pulse generators 19 and 19a, respectively. Various rearrangements and modifications in the locations of the actuators and the pulse generators are possible, however the instant of their passing in close proximity should correspond to the instant of peak earthward force. Additionally, although each of the eccentric weight units is shown with a sensor it is contemplated that only one sensor would be required. The second sensor can however be employed to determine whether the two units are in phase.

The magnitude of the peak force generated by the use of the rotatable element orientation of FIG. 5B is about 0.708 times that of the peak force generated by the use of the rotatable element orientation of FIG. 5A when the rotational speed is the same. FIG. 5A illustrates the orientation of rotatable elements at which the maximum peak force magnitude is generated for a given rotational speed. If the rotatable elements orientation is adjusted such that the counter rotating elements of each unit are 180° apart when they are traveling parallel to the lower surface of base 110 and toward the center thereof, there is no net force generated. Use of a mirror image pair of balanced coaxial counter rotating weight units allows the net force generated to be adjustable and assures that it acts only in a direction perpendicular to the plane connecting the axes of rotation.

In operation, prime mover 20 rotates rotatable elements 111 and 111a in opposing directions which through conversion gears 27 and 27a, respectively, causes rotatable elements 112 and 112a to rotate in opposing directions and in counter rotation to, respectively, rotatable elements 111 and 111a. When actuators 16 and 16a pass, respectively, pulse generators 19 and 19a, pulses are generated, which pulses correspond to the instant of the peak earthward force of the source. It is preferred that all the rotatable elements rotate at the same speed. As the rotational speed is increased, the magnitude of the peak force generated will increase and as the rotational speed is decreased, the magnitude of the peak force generated will decrease, unless the phase shifting means 120 is adjusted as described previously.

The mirror-image pair source can generate a wide variety of coded energy signals. If the source is coupled to the earth, a sinusoidal energy signal will be generated. If the source is allowed to decouple, an energy signal comprising a train of a plurality of impulses will be generated. Either of these energy signals can be coded in any one of a wide variety of ways, including: (1) a time-varying frequency and a naturally varying peak force magnitude signal is generated by maintaining the rod holder 30 in a single position and either accelerating or decelerating the rotational speed of the weights; (2) a time-varying frequency and constant peak force magnitude signal is generated by adjusting the position of the rod holder 30 to maintain a constant peak force magnitude as the rotational speed of the weights is either accelerated or decelerated; and (3) a constant frequency and time varying peak force magnitude signal is generated by maintaining a constant rotational speed as the position of the rod holder 30 is varied to alter the peak force magnitude. Various other codes which can be generated by this mirror image pair source are contemplated and will become obvious to those skilled in the art from this description.

In one embodiment of the method of this invention, the mirror image pair source of this invention is employed to transmit a coded energy signal into the earth as follows: (1) the phase of the rotatable elements are maintained in a position such that no net force is generated by the source as the rotational speed is adjusted to a desired initial speed; (2) after this speed is attained, the position of rod holder 30 is rapidly adjusted to an initial position which corresponds to a desired initial peak force magnitude; (3) thereafter the rotational speed is either accelerated or decelerated as desired and the position of rod holder 30 is adjusted to attain the desired peak force variation. In this manner a coded energy signal of desired frequency and peak force magnitude code is transmitted into the earth. The coded energy signal is ended by rapidly adjusting the position of rod holder 30 such that zero net force is transmitted.

Figure 7:
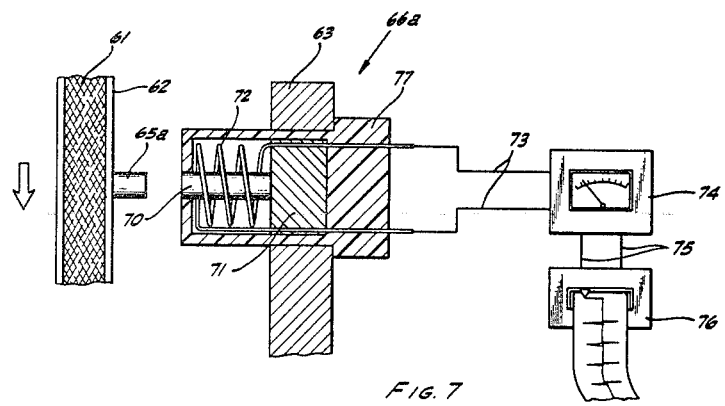
FIGS. 7, 8 and 9 are vertical cross-sections schematically illustrating three embodiments of the sensor useful in this invention.

FIG. 7 illustrates one embodiment of a magnetic position sensor useful in this invention as positioned on the seismic source illustrated in FIG. 2. The magnetic actuator 65a is fixedly attached to pulley 62 which is driven by drive belt 61. Magnetic actuator 65a is a cylindrical metal protrusion, or preferably a magnet. Fixedly attached to base 63, is magnetic pulse generator having a cylindrical metal pole piece 70; a magnet 71; and a conductive wire coil 72 encased in a non-conductive housing 77. The coil 72 is electrically connected to an ammeter 74 via electrical conductor 73. The output of the ammeter is recorded by recorder 76, which is connected to ammeter 74 by electrical conductor 75. The passage of magnetic actuator 65a in close proximity to pulse generator 66a causes a flux in the magnetic field around pole piece 70 which thereby induces a current in coil 72. Unike an accelerometer or geophone in which a pole piece moves within a coil, thereby inducing a current, the relative positions of pole piece 70 and coil 72 are fixed in magnetic pulse generator 66a. This fixed positioning renders the magnetic position sensor relatively insensitive to vibrations, sounds and other interferences thus producing a code signal comprising a plurality of clear, pronounced electrical pulses with a substantially interference-free background.

Figure 8:
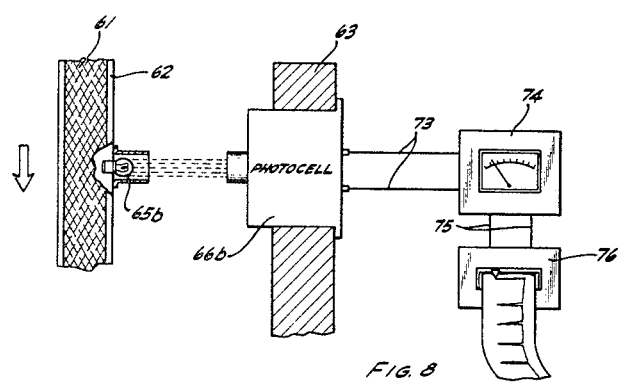

Similarly FIG. 8 illustrates an embodiment of an optical position sensor useful in this invention wherein a light source actuator 65b, which is fixedly attached to pulley 62, actuates the photo cell pulse generator 66b, thereby causing an electrical pulse to be emitted. Ammeter 74, recorder 76 and electrical conductors 73 and 75 are the same as in FIG. 7.

Figure 9:
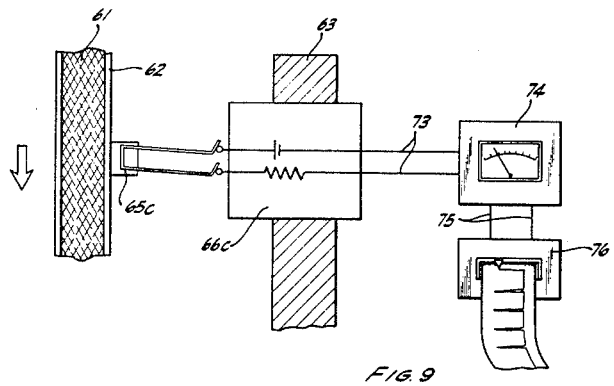

One embodiment of an electrical position sensor is illustrated in FIG. 9, wherein metal contact actuator 65c, which is fixedly attached to pulley 62, completes the otherwise open circuit of electrical pulse generator 66c, causing a pulse of current to flow through electrical conductors 73. Ammeter 74, recorder 76 and lines 73 and 75 are the same as in FIG. 7.

All of these position sensors have the features of being relatively insensitive to undesirable stimuli, such as noise, vibration and other interferences and being sensitive to desirable stimuli, i.e., the passing of the actuator. The ammeter 74 and recorder 76 are illustrated only to demonstrate one method of recording the code signal emitted by the source. In the method of this invention it is preferred that the code signal be transmitted, either by electrical conductors or by radio signal, to the recording device.

The novel seismic sources of this invention have a peak earthward force to total weight ratio greater than about 2. Preferably this ratio is greater than about 5 and more preferably greater than about 10. In contrast, the conventional VIBROSEIS ® type sources which are coupled to the earth require a force to weight ratio of less than 1 in order to avoid decoupling. Since the sources employed in the method of this invention are preferably decoupling sources, the force to weight ratio is only limited by practical mechanical limitations. With the use of strong, lightweight materials such as aluminum or titanium for the non-rotating parts of the source, very high ratios of force to weight are attainable. Accordingly, the weight required for a given impact force is greatly reduced, making the sources of this invention most suitable for exploration of relatively inaccessible regions. Force to weight ratios of 50 and even greater may be practical.

The rotating eccentric weight sources are preferably employed in the exploration method of this invention to generate and transmit into the earth a coded impulse train. Various impulse train exploration methods are known in the art, such as those disclosed in U.S. Pat. Nos. 3,517,380 to Barbier et al., 3,662,970 to Sayous et al. and 3,326,320 to Forester. U.S. Pat. No. 3,698,009 to Barbier discloses an impulse train exploration method in which a train of substantially constant amplitude impulses is transmitted into the earth and the energy returned from within the earth is automatically shift-summed as it is recorded. These prior art methods however are slave-type systems which cause the seismic source to transmit impulses according to a predetermined and usually precisely controlled code. This predetermined code is then used to correlate the raw seismic data. Prior art attempts to use master-type sources, or slave-type sources for which the source signature used to correlate the raw seismic data was not predetermined, have had very little success due to the difficulty experienced in precisely determining the time breaks of the impulses with the prior art sensors. The novel sources of this invention are not so limited.

In a preferred embodiment of the method of this invention, an eccentric weight seismic source of this invention is positioned at a sourcepoint on the earth surface and the rotatable eccentric is rotated at varying speeds which are sufficient to decouple the source from the earth. The source strikes the earth once during each revolution of the rotatable eccentric to thereby generate a coded impulse train, i.e., a coded energy signal comprising a plurality of impulses separated by varying discrete time intervals. As described above, the source includes a position sensor mounted on the source. The position sensor directly detects the instants at which the center of mass of the rotatable eccentric passes that particular angular position about its axis of rotation at which the source develops the peak earthward force during each revolution of the rotatable eccentric. The sensor also generates a code signal characterized by a plurality of discrete pulses and a substantially interference-free background, wherein each of the pulses corresponds exactly to the time break of one of the above described instants.

The code signal generated by the position sensor is used to correlate the raw seismic data which is obtained from one or more geophones, or groups of geophones, at receiver locations which are spaced from the sourcepoint. The correlation technique employed can be the conventional integration method [cf. Sheriff, R. E., *Encyclopedia Dictionary of Exploration Geophysics*, Society of Exploration Geophysicists, Tulsa, Oklahoma, 1973] or can be the type of correlation method disclosed in U.S. Pat. No. 3,698,009 to Barbier, which method is herein termed the "shift-summing" method of correlation. When the seismic source is coupled to the earth in order to transmit a sinusoidal signal into the earth, the integration method of correlation is preferred. On the other hand the shift-summing method is particularly well suited to the method of this invention when the source is allowed to decouple from the earth. The correlation step can be performed in real time, i.e., the data is automatically correlated as it is being received, or the raw data and the code signal can be recorded and processed at a later time either in a computer located on site or a computer located elsewhere.

The pulses of the code signal indicate the exact time break of each occurrence of the peak earthward force. Where the code energy signal transmitted is an impulse train, the code signal can be used directly to correlate the raw seismic data. Although not usually required, the code signal can be "shaped" by making each pulse the same amplitude and breadth prior to integration with the raw seismic data. In the shift-summing method of correlation, of course, only the time break of each pulse is used, not its amplitude. If the coded energy signal transmitted is a sinusoidal signal, then the code signal may be modified to resemble a sinusoidal function by modeling a facsimile signal having the same frequency as the pulses of the code signal and an amplitude which is calculated from the speed of rotation of the rotating eccentric. This modification of the code signal to form a facsimile signal is within the skill of the art.

The raw seismic data obtained can be processed and/or recorded in analog or digital form. As a practical matter, computer processing is required to correlate the raw data and accordingly the raw seismic data is preferably converted to a plurality of digitized samples. These digitized samples contain either the polarity and the amplitude of the raw seismic data, or, in the case of "sign-bit" samples, contain only the polarity of the sample. The processing of "sign-bit only" data is known, for example U.S. Pat. No. 4,058,791 to Martin et al. discloses the use of "sign-bit only" data throughout the correlation and stacking phases of the data processing method.

The use of "sign-bit only" recording and data processing is especially well suited to the method of this invention where the impulses of the coded energy signal transmitted into the ground have low and/or irregular seismic energies, because the sign-bit only processing places greater emphasis on the number of impulses transmitted from each sourcepoint, rather than the magnitude and uniformity of the impulsive energy.

FIG. 1 illustrates an application of another preferred embodiment of the seismic exploration method of this invention to earth strata underlying a horizontal surface. A decoupling seismic source of this invention is positioned on the earth surface and transmits a coded energy signal into the earth; the seismic energy reflected from subsurface reflectors $R_1$, $R_2$ and $R_3$ is sensed with an energy sensing device, such as a geophone, which generates a returned energy signal proportional to the sensed seismic energy; a sign-bit sampling device periodically samples the polarity of the returned energy signal to form a plurality of sign-bit samples; the sign-bit samples are automatically shift-summed in response to a code signal generated by the position sensor, which code signal contains the precise time breaks of the individual source impulses; and the shift-summed samples thus obtained are recorded by the recording device. By this method, a shift-summed trace is obtained in real time. The amplitude of the seismic events due to reflectors $R_1$, $R_2$ and $R_3$ is effectively rebuilt in the shift-summing process.

Although only the reflected seismic waves are illustrated in FIG. 1 it should be understood that the method of this invention can also be successfully employed in other types of seismic exploration, such as refractive seismic exploration.

Other than the novel seismic sources of this invention, the equipment employed in the method of this invention is well known in the art. The energy sensing devices employed onshore are geophones. The recording device preferably is a a minicomputer which includes means for periodically sampling the polarity of the signal generated by the geophones and means for effecting shift-summing of the sign-bit samples as well as means for recording the shift-summed samples. Conventionally one recording device handles data from a plurality of geophone groups, such as 12 or more.

The method of this invention can be employed in any onshore location, it is however particularly useful in exploration of relatively inaccessible regions wherein the prior art methods employing slave-type sources are precluded due to the weight of the required equipment. The various steps and preferred equipment of the method of this invention combine to significantly reduce the weight of the equipment required.

The weight of the seismic source required is reduced, as compared to the prior art systems, because: (1) the use of a master-type decoupling source eliminates the need for heavy source control equipment and holddown weight; (2) by the preferred method of processing and/or recording only the sign-bit of the sensed energy, the force magnitude of the individual impulses is less important than the number of impulses transmitted; and (3) while prior art multiple impulse methods, in which the sensed energy was automatically shift-summed as it is recorded, require seismic sources which transmit substantially identical impulses, the preferred processing of only the sign-bit in the method of this invention makes it possible to employ even the variable-force seismic sources of this invention, such as the devices illustrated in FIGS. 2 and 3, which are generally less sophisticated and lighter weight.

The weight of the required sampling and recording equipment for use in the method of this invention is less than that of the high quality prior art equipment, because: (1) fewer memory positions are required since the seismic data is automatically shift-summed; and (2) since preferably only the sign-bit is sampled, shift-summed and recorded, a less sophisticated sampling device, smaller capacity memory positions and less sophisticated computational capacity are required.

Furthermore, these weight reductions are not achieved at the expense of seismic data quality. Due to the precise record of the impulse time breaks emitted by the position sensors of this invention, the raw seismic data is more accurately correlated, consequently the correlated trace obtained is superior in quality to a trace obtained by correlating the raw seismic data according to the attenuated output signals emitted by the prior art acoustic sensors. In the correlation step, the amplitude of the seismic events on the correlated trace is effectively rebuilt by the shift-summing of the sign-bit samples as the randomly oriented background noise is effectively cancelled and the energy due to seismic events adds in phase.

The coded energy signals which can be transmitted into the earth using a decoupling eccentric weight seismic source comprise a plurality of impulses separated by discrete time intervals. Since the speed of the rotating eccentric cannot be changed instantaneously, from one speed to another, the time intervals between successive impulses necessarily define an ascending pattern, a descending pattern, a constant pattern or a combination of these patterns. The frequency of the impulses can vary between about 0.5 and about 150 impulses per second and more preferably between about 5 and about 75 impulses per second. The minimum time interval between successive impulses should be at least about 10 milliseconds and preferably at least about 15 milliseconds in order to avoid overlap and therefore distortion of the outgoing coded energy signal. The number of impulses in a single coded energy signal can vary from about 10 to about 400 or more. Preferably the coded energy signal consists of a ramp of either steadily increasing or alternatively steadily decreasing frequency, although other codes may be successfully employed. The coded energy signals vary between about 1 and about 20 seconds in length. The preferred coded energy signals are those whose autocorrelation function [cf. Sherrif, R.E., op.cit.] has a largest absolute central-maximum to next-largest absolute maximum ratio of at least about 3. This ratio is preferably at least about 10 and more preferably at least about 20. This ratio can be controlled by proper selection of the pattern of time intervals between impulses as disclosed in U.S. Pat. Nos. 3,622,970 to Sayous et al., 3,698,009 to Barbier; and 3,326,320 to Forester.

In another embodiment of the method of this invention, the decoupling seismic source of this invention is employed to separately transmit a plurality of differently coded energy signals into the earth from the same sourcepoint. A corresponding plurality of code signals are generated by the position sensor. The raw seismic data detected at each geophone location is then correlated with the corresponding code signal to produce a plurality of correlated traces, each of which corresponds to one of the coded energy signals. The correlated traces are then vertically stacked to form a stacked trace. The use of differently coded energy signals serves to attenuate undesirable correlation residuals, thereby effectively improving the resolution of the stacked trace.

In a particularly preferred embodiment of the method of this invention, multiple coverage of a section of earth strata is obtained by separately transmitting a plurality of differently coded impulse trains, such as from 10 to 20 impulse trains, into the earth from a single sourcepoint. The sensor will generate a corresponding plurality of code signals, a plurality of raw seismic data signals will be generated by the energy sensing device, and sign-bit samples extracted from the raw signals will be automatically shift-summed in response to the corresponding code signal. The shift-summed samples are then added to the previously recorded shift-summed samples for the same receiver location. A vertically stacked shift-summed trace is thereby automatically obtained in real time, eliminating the need to separately record each of the shift-summed traces before vertically stacking them. The use of differently coded impulse trains results in smaller correlation residuals than repeated use of a single code.

The correlated and/or vertically stacked correlated traces obtained in the method of this invention can be further processed by conventional seismic data processing methods which are well known in the art. Such methods include: common depth point stacking, moveout corrections, frequency filtering, and correlation residual reduction processing.

This invention is further illustrated by the following example which is illustrative of one specific mode of practicing the invention and is not intended as limiting the scope of the invention as defined by the appended claims.

EXAMPLE

Figure 6D:
FIGS. 6A through 6D are graphical representations comparing the source signatures emitted by the prior art seismic source sensors with the source signature emitted by the sensor of this invention.

A rotating eccentric weight source of the type illustrated in FIG. 2, manufactured by installing an Electro TM 3010AN magnetic sensor on a Wacker TM VPG 600 vibro plate compactor, is employed to transmit a coded impulse train into the earth. Several different sensors are employed to sense the time breaks of each of the impulses. According to the various source code sensing methods taught in the prior art, an accelerometer is attached to the base of the source and a geophone is coupled to the ground a short distance away from the source. Records of the output from each of the acoustic sensors of the prior art and of a magnetic position sensor of this invention were made. These records are graphically illustrated in FIGS. 6A through 6D. FIG. 6A is the output of the accelerometer, FIG. 6B is the output of the geophone, FIG. 6D is the output of the magnetic position sensor of this invention, and FIG. 6C is a representation of the actual time breaks.

Figure 6C:
Figure 6B:
Figure 6A:
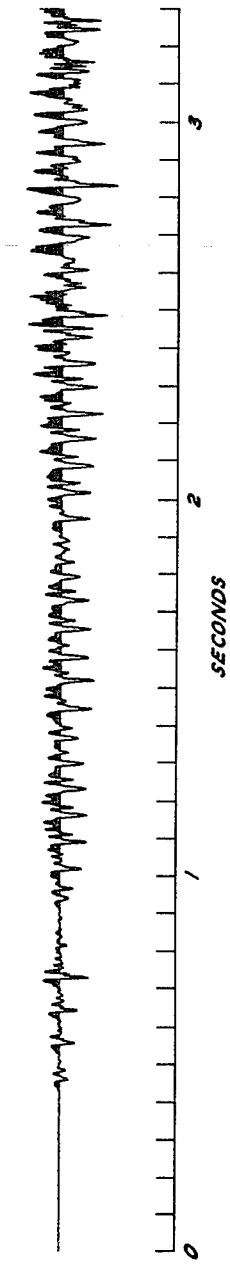

It is obvious from a comparison of each output with FIG. 6C that the source signature obtained by recording the output of the position sensor of this invention is much superior to the source signatures produced by recording the output of the prior art acoustic sensor. Accordingly the correlated seismic traces, obtained by shift-summing the raw seismic data in response to the code signal generated by the position sensor of this invention, will necessarily be of superior quality to the correlated seismic traces obtained with use of the prior art sensors.

While particular embodiments of the invention have been described, it will be understood, of course, that the invention is not limited thereto since many obvious modifications can be made, and it is intended to include within this invention any such modifications as will fall within the scope of the claims.

Having now described the invention, I claim:

1. A method for the seismic exploration of earth strata underlying an earth surface between a sourcepoint and a receiver location, which comprises:
(a) positioning on said earth surface at said sourcepoint a seismic source having (1) a first eccentric element which is rotatable about a first axis of rotation and (2) a position sensor comprised of a first sensor element and a second sensor element;
(b) rotating said first eccentric element and said first sensor element about said first axis of rotation at varying speeds, thereby transmitting into said earth strata a coded energy signal having a frequency variable code;

(c) positioning said second sensor element at a selected position about said first axis of rotation such that said first sensor element passes in close proximity to said second sensor element at and only at the instant at which the center of mass of said first eccentric element passes that angular position about said first axis of rotation at which said seismic source develops the peak earthward force during each revolution of said first eccentric element;

(d) causing one of said first or second sensor elements to generate a code signal characterized by a substantially interference-free background and a plurality of discrete pulses, each of said pulses corresponding to one of the instants at which said first sensor element passes in close proximity to said second sensor element;

(e) sensing seismic energy returning from said earth strata to said receiver location in order to obtain raw seismic data which is proportional to said seismic energy; and (f) correlating said raw seismic data with said code signal to thereby form a correlated trace which is indicative of the structure of said earth strata.

2. The method defined in claim 1 wherein said seismic source is coupled to said earth surface at said sourcepoint such that the coded energy signal transmitted into said earth strata during step (b) comprises a variable-frequency sinusoidal signal.

3. The method defined in claim 1 wherein during step (b) said first eccentric element is rotated at varying speeds sufficient to cause said seismic source to alternately decouple from and impact against said earth surface once during each revolution of said first eccentric element whereby the coded energy signal transmitted into said earth strata during step (b) comprises a plurality of impulses separated by varying discrete time intervals.

4. The method defined in claim 3 wherein said coded energy signal is comprised of between 10 and 400 impulses, and wherein said discrete time intervals define an ascending pattern, a descending pattern or a combination thereof.

5. The method defined in claim 3 wherein only the polarity of said seismic energy is sensed in step (e) in order to obtain said raw seismic data in sign-bit only form, and wherein during step (f) said raw seismic data is correlated with said code signal by the shift-summing method.

6. The method defined in claim 1 wherein the rotational speed of said eccentric element is varied in a preselected manner between 0.5 and 150 revolutions per second such that the autocorrelation function of the corresponding code signal generated in step (d) has a ratio of its largest to next-largest absolute maxima of at least 3.

7. The method defined in claim 1 wherein said steps (b) through (f) are repeated a plurality of times such that a plurality of said coded energy signals, each having a different frequency variable code, are separately transmitted into said earth strata from said sourcepoint and a corresponding plurality of said correlated traces are obtained; and wherein said method further comprises the step of vertically stacking said plurality of correlated traces to form a stacked trace.

8. The method defined in claim 1 wherein said step (b) further comprises: (1) rotating a second eccentric element about said first axis of rotation at the same speed as, and in counter-rotation to, said first eccentric element; (2) counter-rotating a third eccentric element and a fourth eccentric element at the same speed about a second axis of rotation parallel to and spaced from said first axis of rotation; and (3) adjusting the rotational speed of said eccentric elements and the phase relationships between said first and second eccentric elements and between said third and fourth eccentric elements so as to impart to said coded energy signal a desired force and frequency code.

9. The method defined in claim 8 wherein the phase relationships of said eccentric elements are adjusted such that the peak earthward force developed by the seismic source remains at substantially the same magnitude as the rotational speed of said eccentric elements is changed during step (b).

10. A method for the seismic exploration of earth strata underlying an earth surface between a sourcepoint and a receiver location, which comprises:
(a) positioning on said earth surface at said sourcepoint a seismic source having (1) a first eccentric element which is rotatable about a first axis of rotation and (2) a position sensor comprised of a first sensor element and a second sensor element;

(b) rotating said first eccentric element and said first sensor element about said first axis of rotation at varying speeds between 0.5 and 150 revolutions per second, said speeds being sufficient to cause said seismic source to alternately decouple from and impact against said earth surface once during each revolution of said first eccentric element, so as to transmit into said earth strata a coded energy signal comprised of between 10 and 400 impulses separated by varying discrete time intervals;

(c) positioning said second sensor element at a selected position about said first axis of rotation such that said first sensor element passes in close proximity to said second sensor element at and only at the instant at which the center of mass of said first eccentric element passes that angular position about said first axis of rotation at which said seismic source develops the peak earthward force during each revolution of said first eccentric element;

(d) causing said second sensor element to generate a code signal characterized by a substantially interference-free background and a plurality of discrete pulses, each of said pulses indicating the time break of one of the instants at which said first sensor element passes in close proximity to said second sensor element;

(e) sensing seismic energy returning from said earth strata to said receiver location in order to obtain raw seismic data which is proportional to said seismic energy; and (f) shift-summing said raw seismic data according to the pulses of said code signal to thereby form a correlated trace which is indicative of the structure of said earth strata.

11. The method defined in claim 10 wherein during step (b) the rotational speed of said eccentric element is controlled such that said time intervals define an ascending pattern, a descending pattern or a combination thereof which is selected such that the autocorrelation function of the code signal generated in step (d) has a ratio of its largest to next-largest absolute maxima of at least 3.

12. The method defined in claim 11 wherein said steps (b) through (f) are repeated between 10 and 20 times such that a corresponding plurality of said coded energy signals, each having a different selected pattern of said time intervals, are separately transmitted into said earth strata from said sourcepoint and a corresponding plurality of said correlated traces are obtained; and wherein said method further comprises the step of vertically stacking said plurality of correlated traces to form a stacked trace.

13. The method defined in claim 10 wherein only the polarity of said seismic energy is sensed in step (e) in order to obtain said raw seismic data in sign-bit-only form and wherein during step (f) said raw seismic data is automatically shift-summed in real time to form each of said plurality of correlated traces.

14. The method defined in claim 10 wherein said step (b) further comprises: (1) rotating a second eccentric element about said first axis of rotation at the same speed as and in counterrotation to said first eccentric element; (2) counter-rotating a third and a fourth eccentric element at the same speed about a second axis of rotation parallel to and spaced from said first axis of rotation, said first, second, third and fourth eccentric elements having equal eccentric moments about their respective axes of rotation; (3) adjusting the rotational speed of said eccentric elements such that said coded energy signal has a desired frequency variable code; and (4) adjusting the phase relationships between said first and second eccentric elements and between said third and fourth eccentric elements such that the peak earthward force developed by said seismic source remains at substantially the same magnitude during step (b).

15. A method for the seismic exploration of earth strata underlying an earth surface between a sourcepoint and a receiver location, which comprises:
(a) positioning on said earth surface at said sourcepoint a seismic source having (1) a first eccentric element which is rotatable about a first axis of rotation and (2) a position sensor comprised of a first sensor element and a second sensor element;
(b) rotating said first eccentric element and said first sensor element about said first axis of rotation at varying speeds between 0.5 and 150 revolutions per second, said speeds being sufficient to cause said seismic source to alternately decouple from and impact against said earth surface once during each revolution of said first eccentric element, so as to transmit into said earth strata a coded energy signal comprised of between 10 and 400 impulses separated by varying discrete time intervals which define an ascending pattern, a descending pattern or a combination thereof;
(c) positioning said second sensor element at a selected position about said first axis of rotation such that said first sensor element passes in close proximity to said second sensor element at and only at the instant at which the center of mass of said first eccentric element passes that angular position about said first axis of rotation at which said seismic source develops the peak earthward force during each revolution of said first eccentric element;
(d) causing said second sensor element to generate a code signal characterized by a substantially interference-free background and a plurality of discrete pulses, each of said pulses indicating the time break of one of the instants at which said first sensor element passes in close proximity to said second sensor element;
(e) sensing seismic energy returning from said earth strata to said receiver location in order to obtain raw seismic data which is proportional to said seismic energy;
(f) shift-summing said raw seismic data according to the pulses of said code signal to thereby form a correlated trace which is indicative of the structure of said earth strata;
(g) thereafter repeating said steps (b) through (f) between 10 and 20 times such that a corresponding plurality of said coded energy signals, each having a different selected pattern of said time intervals, are separately transmitted into said earth strata from said sourcepoint and a corresponding plurality of correlated traces are formed, said selected pattern of said time intervals being selected such that the autocorrelation function of the code signal generated in step (d) has a ratio of its largest to next-largest absolute maxima of at least 3; and
(h) vertically stacking said plurality of correlated traces to form a stacked trace.

* * * * *